(12) United States Patent
Kaji et al.

(10) Patent No.: US 9,815,156 B2
(45) Date of Patent: Nov. 14, 2017

(54) POSITIONING APPARATUS

(75) Inventors: Kenta Kaji, Hyogo (JP); Gaku Yoshimura, Hyogo (JP)

(73) Assignee: KOSMEK LTD., Hyogo (JP)

( * ) Notice: Subject to any disclaimer, the term of this patent is extended or adjusted under 35 U.S.C. 154(b) by 747 days.

(21) Appl. No.: 13/985,955

(22) PCT Filed: Feb. 14, 2012

(86) PCT No.: PCT/JP2012/053398
§ 371 (c)(1),
(2), (4) Date: Aug. 16, 2013

(87) PCT Pub. No.: WO2012/111666
PCT Pub. Date: Aug. 23, 2012

(65) Prior Publication Data
US 2013/0320607 A1    Dec. 5, 2013

(30) Foreign Application Priority Data

Feb. 18, 2011   (JP) .................................. 2011-050766

(51) Int. Cl.
*B23Q 3/06* (2006.01)
*B23Q 1/00* (2006.01)

(52) U.S. Cl.
CPC ............... *B23Q 3/06* (2013.01); *B23Q 1/009* (2013.01)

(58) Field of Classification Search
USPC ............................................. 269/48.1, 48.3
See application file for complete search history.

(56) References Cited

U.S. PATENT DOCUMENTS 6,095,509 A    8/2000    Yonezawa
7,303,186 B2   12/2007   Yonezawa et al.
(Continued)

FOREIGN PATENT DOCUMENTS

EP    1726399 A1    11/2006
JP    11188551 A    7/1999
(Continued)

OTHER PUBLICATIONS

European Search Report dated Jun. 17, 2014 in relation to corresponding to European Patent application.
(Continued)

*Primary Examiner* — Joseph J Hail
*Assistant Examiner* — Brian Keller
(74) *Attorney, Agent, or Firm* — Bacon & Thomas, PLLC

(57) ABSTRACT

A strut (6) of a circular plug projects upward from a main body (4) of a housing (3) and inserts into circular hole (9) of work (8). An opening (20) is formed laterally in a left portion of peripheral wall (18) of strut (6), a cam portion (28) projects leftward from a right portion of the peripheral wall (18). A positioning rod (22) inserts into insertion hole (14) in upper portion of housing (3) which is movable vertically and radially. A cam surface (32) is provided vertically on upper right portion of positioning rod (22), and pushing portion (33) is provided on upper left portion thereof. When a driving arrangement (D) drives positioning rod (22) downward for locking, cam portion (28) pushes the cam surface (32) leftward, and pushing portion (33) passes through opening (20) to press inner periphery of the circular hole (9) of work (8).

20 Claims, 9 Drawing Sheets

(56) References Cited

U.S. PATENT DOCUMENTS

| | | | |
|---|---|---|---|
| 2003/0160374 A1* | 8/2003 | Yonezawa | B25B 5/087 269/309 |
| 2004/0250855 A1* | 12/2004 | Hyde | F16K 49/002 137/341 |
| 2006/0033255 A1 | 2/2006 | Yonezawa et al. | |
| 2006/0049568 A1 | 3/2006 | Yonezawa et al. | |
| 2007/0001360 A1 | 1/2007 | Haruna | |
| 2007/0075472 A1* | 4/2007 | Sawdon | B25B 5/062 269/49 |
| 2007/0262508 A1* | 11/2007 | Haruna | B23Q 1/009 269/309 |

FOREIGN PATENT DOCUMENTS

| | | |
|---|---|---|
| JP | 2003159617 | 6/2003 |
| WO | 2004060607 A1 | 7/2004 |
| WO | 2005014225 A1 | 2/2005 |
| WO | 2007074737 A1 | 12/2006 |
| WO | 2007074737 A1 | 7/2007 |

OTHER PUBLICATIONS

PCT Notification of Transmittal of Translation of the International Preliminary Report on Patentabilty dated Aug. 29, 2013 for PCT/JP2012/053398.

\* cited by examiner

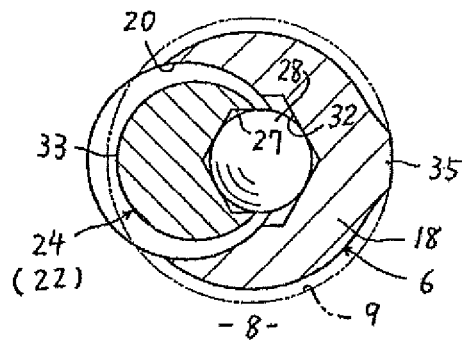
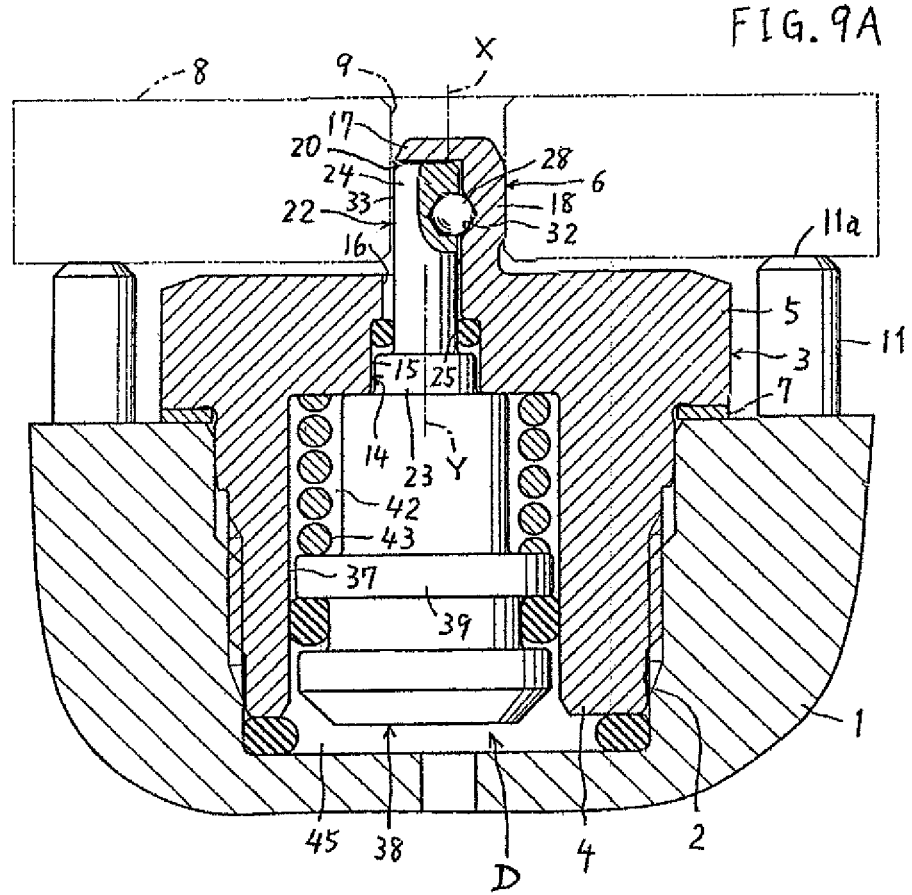

POSITIONING APPARATUS

TECHNICAL FIELD

The present invention relates to an apparatus which positions a to-be-positioned member such as a work, a work pallet, or a metal die, and more particularly relates to an apparatus suitable for positioning the to-be-positioned member using a smaller diameter circular hole opened in the to-be-positioned member.

BACKGROUND ART

As such a positioning apparatus, conventionally, there is a positioning apparatus described in Patent Literature 1 (WO2007/074737). This conventional art is structured as follows (see FIG. 19A and FIG. 19B of the Patent Literature 1).

A circular plug is projected upward from a main body of a housing. The circular plug is able to be inserted into a circular hole of a work pallet lowered from above. An insertion hole is opened, coaxially with the circular plug, in an upper portion of the housing, and a positioning rod is vertically movably inserted into the insertion hole. Further, a through hole is opened laterally in a peripheral wall of the circular plug, and a ball is radially movably supported in the through hole. A cam surface is formed on the positioning rod so as to face the ball. When the positioning rod is driven to be lowered, the cam surface pushes the ball radially outwardly, and thereby, the ball is pressed onto an inner periphery of the circular hole of the work pallet.

CITATION LIST

Patent Literature

Patent Literature 1: International Publication WO2007/074737

SUMMARY OF INVENTION

Technical Problem

The above conventional art is advantageous in that the work pallet is precisely positioned since the ball is pressed onto the inner periphery of the circular hole of the work pallet; however, there remains room for improvement, in the following respect.

Since the through hole which supports the ball horizontally movably has to be opened laterally, it is required for the peripheral wall of the circular plug to have a large thickness. This causes the outer diameter size of the circular plug to be larger, and such a positioning apparatus has not been able to be used when the circular hole of a work pallet has a smaller diameter.

An object of the present invention is to improve the apparatus so that a to-be-positioned member can be positioned even if a circular hole provided in the to-be-positioned member such as a work pallet has a smaller diameter.

Solution to Problem

In order to achieve the above object, for example as shown in FIG. 1A to FIG. 2B, FIG. 5A and FIG. 5B, respective figures of FIG. 6 to FIG. 8, or, FIG. 9A and FIG. 9B, a positioning apparatus is structured as follows, in an aspect of the present invention.

A strut 6 is projected upward from a main body 4 of a housing 3. A positioning rod 22 is inserted into an upper portion of the housing 3 so as to be movable vertically and radially, and the positioning rod 22 is brought to face the strut 6. The positioning rod 22 is able to be inserted, together with the strut 6, into a circular hole 9 of a to-be-positioned member 8. A cam portion 28 is projected from one member out of two members which are the strut 6 and the positioning rod 22 toward the other member, and the cam portion 28 is provided to the one member. A cam surface 32 which makes an engagement with the cam portion 28 is provided vertically on the other member. A pushing portion 33 is provided on an outer periphery portion of the positioning rod 22 at a position opposite to the cam surface 32 and the cam portion 28, and the pushing portion 33 is configured to be able to face an inner periphery of the circular hole 9 of the to-be-positioned member 8. A driving means D which drives the positioning rod 22 vertically is provided. The positioning apparatus is configured so that, when the driving means D drives the positioning rod 22 either upward or downward for locking, the cam portion 28 presses, via the cam surface 32, the pushing portion 33 onto the inner periphery of the circular hole 9 of the to-be-positioned member 8.

The above aspect of the present invention provides following functions and effects.

In a released state, the circular hole of the to-be-positioned member is fitted around the strut and the positioning rod with a predetermined fitting gap.

During a locking drive, the cam portion moves the positioning rod via the cam surface, and the pushing portion of the positioning rod presses the inner periphery of the circular hole of the to-be-positioned member, and therefore, the to-be-positioned member is positioned with respect to a horizontal direction by the pushing portion and the outer periphery portion of the strut.

Unlike the above-mentioned conventional art, in the present invention, it is not necessary to provide the strut with a through hole which supports the ball horizontally movably, in order to perform positioning. This decreases the outer diameter size of the strut, which makes it possible to position the to-be-positioned member having a smaller diameter circular hole.

It is preferable to add the following features to the above aspect of the present invention.

The strut 6 is formed into a plug shape so as to correspond to the circular hole 9 of the to-be-positioned member 8. An insertion hole 14 having a hole axis Y which is eccentric relative to a central axis X of the strut 6 is formed vertically in the upper portion of the housing 3. The positioning rod 22 is inserted into the insertion hole 14. An opening 20 is formed laterally in a peripheral wall portion of a peripheral wall 18 of the strut 6, which portion is closer to the hole axis Y. The positioning apparatus is configured so that the pushing portion 33 passes through the opening 20 to be pressed onto the inner periphery of the circular hole 9 of the to-be-positioned member 8.

Here, the "plug shape" of the strut 6 means a shape which allows the strut 6 to be inserted along the substantially entire inner periphery of the circular hole 9, and it encompasses circular, oval, and rhombus shapes in a plan view.

In this aspect of the invention, the strut is formed into the plug shape, and therefore its rigidity is higher than that formed into a semicircular shape or a bow shape. With this, positioning accuracy of the positioning apparatus is improved.

Further, in order to achieve the object, for example as shown in FIG. 1A to FIG. 2B, FIG. 5A and FIG. 5B, respective figures of FIG. 6 to FIG. 8, or FIG. 9A and FIG. 9B, a positioning apparatus is structured as follows in another aspect of the present invention.

A strut 6 is projected upward from a main body 4 of a housing 3. The strut 6 is formed into a plug shape so as to be inserted into a circular hole 9 of a to-be-positioned member 8. An insertion hole 14 is formed vertically in an upper portion of the housing 3. The insertion hole 14 has a hole axis Y which is eccentric relative to a central axis X of the strut 6. An opening 20 is formed laterally in a peripheral wall portion of a peripheral wall 18 of the strut 6, which portion is closer to the hole axis Y. A positioning rod 22 is inserted into the insertion hole 14 so as to be movable vertically and radially. A cam portion 28 is provided at a position opposite to the opening 20, and the cam portion 28 is provided to one member out of two members which are the strut 6 and the positioning rod 22 so as to project from the one member toward the other member. A cam surface 32 which makes an engagement with the cam portion 28 is provided vertically on the other member. A pushing portion 33 is provided on an outer periphery portion of the positioning rod 22 at a position closer to the opening 20, and the pushing portion 33 is configured to be able to face an inner periphery of the circular hole 9 of the to-be-positioned member 8. A driving means D which drives the positioning rod 22 vertically is provided. The positioning apparatus is configured so that, when the driving means D drives the positioning rod 22 either upward or downward for locking, the cam portion 28 pushes the pushing portion 33 via the cam surface 32 toward the opening 20, and thereby, the pushing portion 33 passes through the opening 20 to be pressed onto the inner periphery of the circular hole 9 of the to-be-positioned member 8.

Here, the "plug shape" of the strut 6 means a shape which allows the strut 6 to be inserted along the substantially entire inner periphery of the circular hole 9, and it encompasses circular, oval, and rhombus shapes in a plan view.

The above aspect of the present invention provides following functions and effects.

In the released state, the circular hole of the to-be-positioned member is fitted around the plug-shape strut and the positioning rod with a predetermined fitting gap.

During a locking drive, the cam portion moves the positioning rod via the cam surface, and the pushing portion of the positioning rod presses the inner periphery of the circular hole of the to-be-positioned member, and therefore, the to-be-positioned member is positioned with respect to the horizontal direction by the pushing portion and the outer periphery portion of the strut.

Unlike the above-mentioned conventional art, in the present invention, it is not necessary to provide the strut with a through hole which supports the ball horizontally movably, in order to perform positioning. This decreases the outer diameter size of the strut, which makes it possible to position the to-be-positioned member having a smaller diameter circular hole.

Further, since the strut is formed into the plug shape, its rigidity is higher than that formed into a semicircular shape or a bow shape. With this, positioning accuracy of the positioning apparatus is improved.

In each aspect of the present invention, it is preferable that the cam portion 28 is provided to the strut 6, and the cam surface 32 is provided on the positioning rod 22.

Further, in each aspect of the present invention, the following structure is also possible that the cam portion 28 is provided to the positioning rod 22 and the cam surface 32 is provided on the strut 6.

In the present invention, it is preferable that the cam surface 32 is formed so that the cam surface 32 becomes closer to an axis of the positioning rod 22 or the central axis X of the strut 6 in a downward direction.

Further, it is preferable that the cam surface 32 includes a bottom wall of a cam groove 30 formed in the positioning rod 22 or in the strut 6.

Furthermore, it is preferable that the cam portion 28 includes a ball which is fitted into the cam groove 30.

In the present invention, it is preferable that the strut 6 includes a top wall 17 which covers an upper portion of the positioning rod 22. With this, foreign matter such as swarf and dust is prevented from intruding into the insertion hole of the positioning rod. Further, the top wall enables the strut to be inserted smoothly into the circular hole provided in the to-be-positioned member such as a work.

Further, in the present invention, it is preferable that a guide hole 57 which tapers down in an upward direction is opened in an under surface of the top wall 17, and a guide portion 56 which is fitted into the guide hole 57 from below is provided on the upper portion of the positioning rod 22.

Furthermore, in the present invention, for example as shown in FIG. 5A and FIG. 5B, it is preferable that: a detection hole 58c which is configured to be closed with the guide hole 57 is opened in an upper portion of the guide portion 56; and the apparatus is configured so that pressurized air for detecting a released state is suppliable to the detection hole 58c.

Further, in the present invention, for example as shown in FIG. 6, it is preferable that: a detection hole 59c is opened in an outer peripheral surface of the pushing portion 33; and the apparatus is configured so that pressurized air for detecting a locked state is suppliable to the detection hole 59c.

In the present invention, it is preferable that an elastic member 25 which urges the positioning rod 22 toward the hole axis Y of the insertion hole 14 is attached to the housing 3.

Moreover, in the present invention, it is preferable that: the insertion hole 14 includes a lower insertion hole 15 having the hole axis Y and an upper insertion hole 16 arranged above the lower insertion hole 15; and a hole axis of the upper insertion hole 16 is arranged to be eccentric relative to the hole axis Y in a direction away from the central axis X, and thereby, the opening 20 is formed in the peripheral wall 18 of the strut 6.

In this case, the eccentric upper insertion hole makes it easier to form the opening in the strut of the circular plug shape.

Further, in the present invention, it is preferable that the driving means D includes: a rod hole 37 formed in the main body 4 of the housing 3; and an output rod 38 vertically movably inserted into the rod hole 37, and the positioning rod 22 is connected to the output rod 38.

In this aspect of the present invention, it is conceivable that the rod hole 37 is arranged coaxially with the insertion hole 14, or, the rod hole 37 is arranged coaxially with the strut 6.

Further, in the above aspect of the present invention, the following structure is also possible that the output rod 38 and the positioning rod 22 are formed integrally with each other, and the output rod 38 is radially movably inserted into the rod hole 37. Alternatively, the positioning rod 22 may be radially movably connected to the output rod 38.

Further, in the present invention, it is preferable that a single positioning projection 35 is provided on the outer periphery portion of the strut 6 at a position opposite to the pushing portion 33.

Furthermore, in the present invention, two positioning projections 35, 35 may be provided on the outer periphery portion of the strut 6, and the two positioning projections 35, 35 and the pushing portion 33 may be arranged circumferentially at predetermined intervals.

BRIEF DESCRIPTION OF DRAWINGS

FIG. 1A is an elevational sectional view of a released state of a positioning apparatus. FIG. 1B is a section taken along a line B-B of FIG. 1A.

FIG. 5A is a view similar to FIG. 1A. FIG. 5B is a view similar to FIG. 3.

FIG. 9A and FIG. 9B show a sixth embodiment of the present invention. FIG. 9A is a view similar to FIG. 1A. FIG. 9B is a view similar to FIG. 3.

REFERENCE SIGNS LIST

Figure 1B:
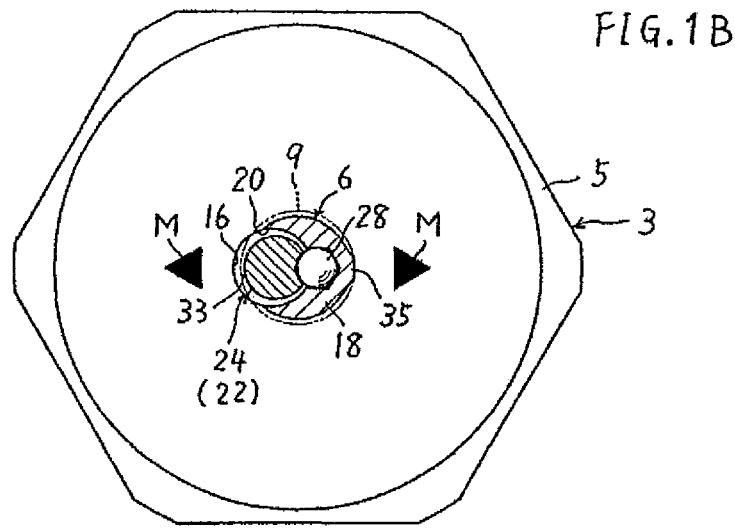
FIG. 1A and FIG. 1B show a first embodiment of the present invention.

3: housing, 4: main body, 6: strut, 8: to-be-positioned member (work), 9: circular hole, 14: insertion hole, 15: lower insertion hole, 16: upper insertion hole, 17: top wall of strut 6, 18: peripheral wall of strut 6, 20: opening, 22: positioning rod, 25: elastic member (sealing member), 28: cam portion (ball), 30: cam groove, 32: cam surface, 33: pushing portion, 35: positioning projection, 37: rod hole, 38: output rod, X: central axis of strut 6, Y: hole axis of insertion hole 14, D: driving means

DESCRIPTION OF EMBODIMENTS

FIG. 1A to FIG. 3 show a first embodiment of the present invention. First, with reference to FIG. 1A and FIG. 1B, and FIG. 3, a structure of a positioning apparatus will be described.

A housing 3 is screwed in an attachment hole 2 opened in a base member 1 such as a table. The housing 3 includes a main body 4 and a strut 6 of a circular plug shape, which is projected upward from an upper flange 5 of the main body 4. Further, a shim 7 is attached between a top surface of the base member 1 and an under surface of the upper flange 5.

A circular hole 9 is opened in a work 8 functioning as a to-be-positioned member. The work 8 is lowered, and thereby the strut 6 of the circular plug shape is inserted into the circular hole 9 coming from above, with a predetermined fitting gap therebetween. The work 8 is received on seating surfaces 11a of seating members 11 projected upward from the base member 1. Note that, instead of this, a seating surface may be provided on an upper portion of the upper flange 5.

In the upper flange 5 and the strut 6, an insertion hole 14 is formed vertically. The insertion hole 14 includes: a lower insertion hole 15 having a hole axis Y which is eccentric to the left in the figure relative to a central axis X of the strut 6; and an upper insertion hole 16 arranged above the lower insertion hole 15. Further, the strut 6 includes a top wall 17, and the top wall 17 covers an upper portion of a positioning rod 22 which will be described later.

An opening 20 is formed laterally at a peripheral wall portion of a peripheral wall 18 of the strut 6, which portion is closer to the hole axis Y (a left peripheral wall portion in the figures). To be more specific, a hole axis of the upper insertion hole 16 is eccentric in a direction away from the central axis X (to the left in the figures), relative to the hole axis Y of the lower insertion hole 15. The upper insertion hole 16 is thus machined, and thereby a left portion of the peripheral wall 18 is widely cut off horizontally, so that the opening 20 is formed (see FIG. 3).

A positioning rod 22 which is circular in section is inserted into the insertion hole 14 so as to be movable vertically and radially. The positioning rod 22 includes: a lower rod 23 having a larger diameter; and an upper rod 24 having a smaller diameter, and these two rods 23 and 24 are formed integrally with each other. A sealing member (elastic member) 25 made of an O ring is attached between the upper rod 24 and the lower insertion hole 15. By an elastic force of the sealing member 25, the positioning rod 22 is centered coaxially with the hole axis Y. Further, the sealing member 25 prevents foreign matter such as swarf and dust from intruding into a later-described rod hole 37.

At a right position opposite to the opening 20, a support hole 27 is opened in an inner periphery of the peripheral wall 18 of the strut 6. In the support hole 27, a ball 28 functioning as a cam portion is fitted. A left portion of the ball 28 is projected leftward, relative to an inner peripheral surface of the peripheral wall 18.

At an upper right outer periphery portion of the upper rod 24, a cam groove 30 and a retreat groove 31 each having an arc shape in a plan view are provided vertically. A cam surface 32 is formed on a bottom wall of the cam groove 30, and the cam surface 32 is formed so that the cam surface 32 becomes closer to an axis of the positioning rod 22 in a downward direction. The ball 28 is engageable with the cam surface 32.

Meanwhile, a pushing portion 33 is provided on a left portion of the outer periphery portion of the upper rod 24, and the pushing portion 33 is brought to face an inner periphery of the circular hole 9 of the work 8.

Moreover, at a right position opposite to the pushing portion 33, a single positioning projection 35 is provided on an outer periphery portion of the strut 6. Further, to indicate a direction of the line connecting the positioning projection 35 and the pushing portion 33, two arrows M, M are inscribed on a top surface of the upper flange 5 (see FIG. 1B and FIG. 2B).

A driving means D which drives the positioning rod 22 vertically is structured as follows.

The rod hole 37 is opened in the main body 4 of the housing 3, and the rod hole 37 is communicatively connected to the lower insertion hole 15 coaxially therewith. An output rod 38 is inserted into the rod hole 37 so as to be movable vertically and radially. In this embodiment, the output rod 38 and the positioning rod 22 are formed integrally with each other.

A piston 39 is provided to a lower portion of the output rod 38, and the piston 39 is vertically movably inserted into the rod hole 37 with a sealing member 40. A lock spring 43 is attached in a lock chamber 42 formed above the piston 39, and a supply and discharge port 46 for compressed air is communicatively connected to a release chamber 45 formed below the piston 39.

The positioning apparatus having the above structure operates as follows.

Figure 1A:
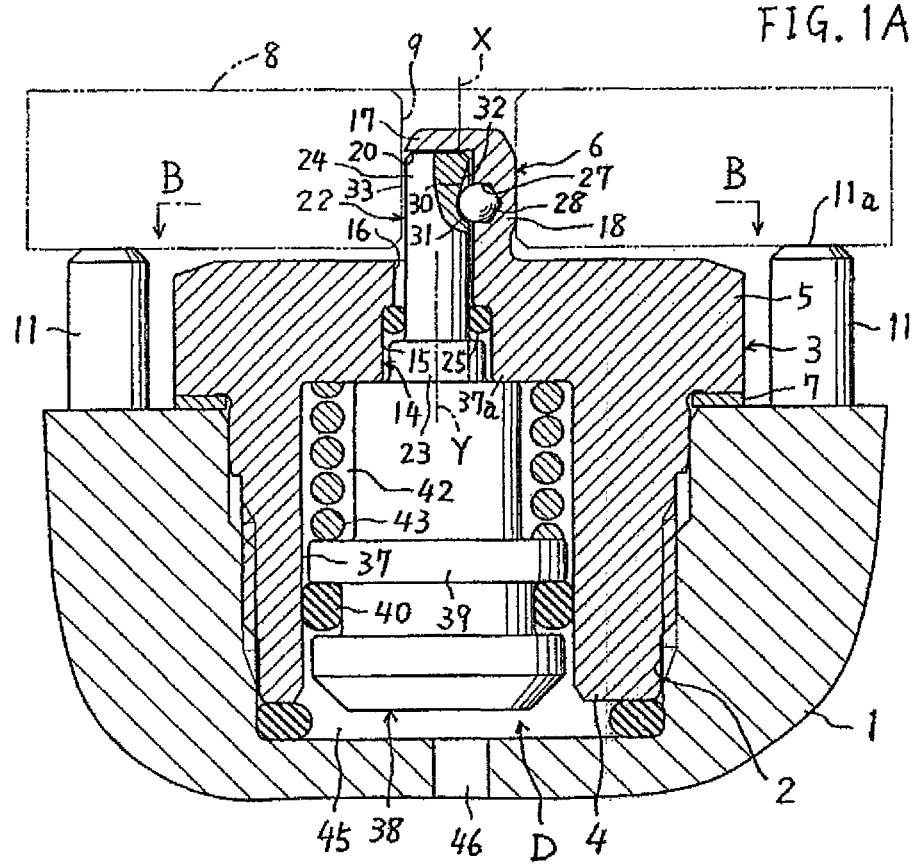

In a released state shown in FIG. 1A and FIG. 1B (and FIG. 3), compressed air has been supplied to the release chamber 45, so the piston 39 and the positioning rod 22 are raised against an urging force of the lock spring 43, and an upper portion of the output rod 38 is received on a top wall 37*a* of the rod hole 37. Meanwhile, the ball 28 is accommodated in the retreat groove 31.

Under the released state, the circular hole 9 of the work 8 is fitted around the strut 6 from above, and an under surface of the work 8 is received on the seating surfaces 11*a*.

Figure 2B:
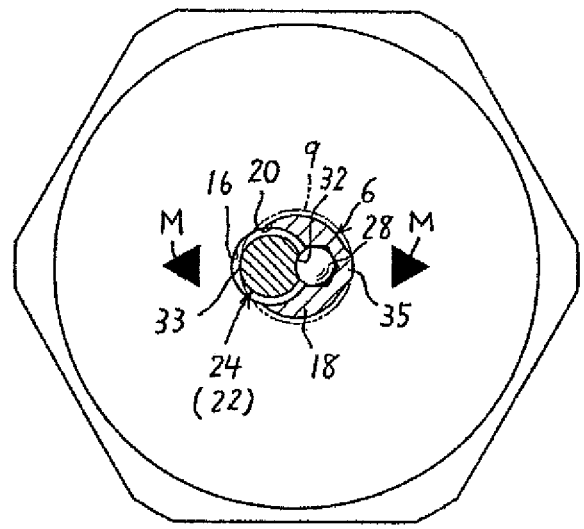
FIG. 2A and FIG. 2B show a locked state of the positioning apparatus, and correspond to FIG. 1A and FIG. 1B, respectively.
Figure 2A:
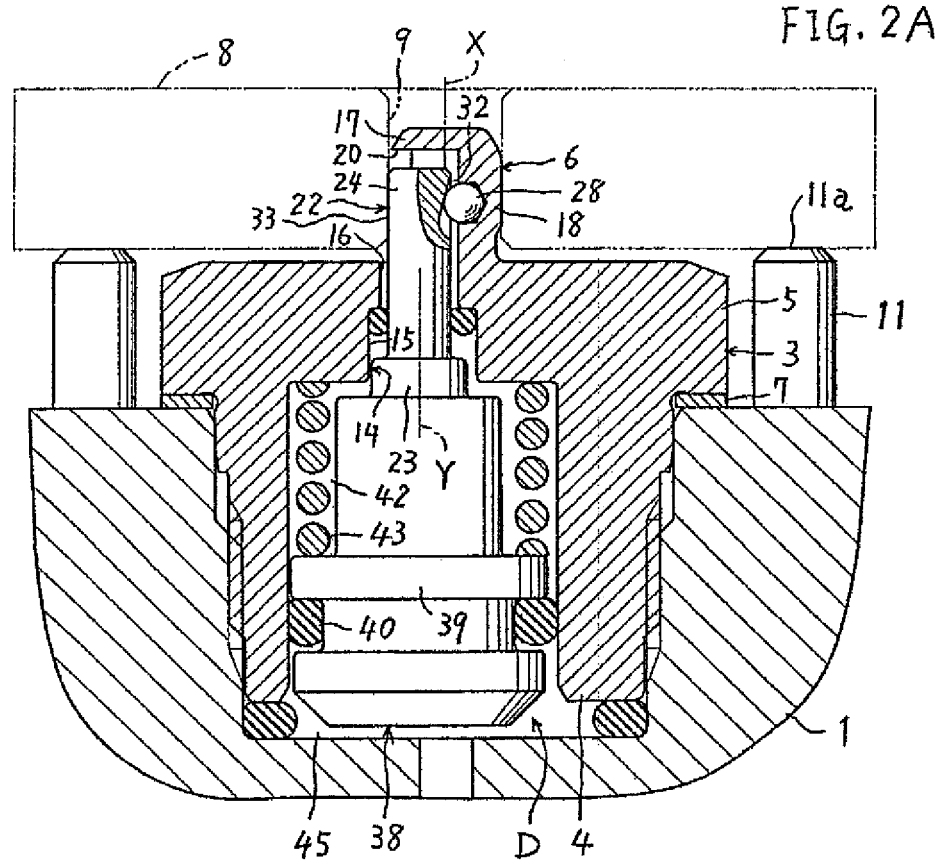

When the apparatus is switched from the released state to a locked state, the compressed air in the release chamber 45 is discharged, and then, as shown in the locked state of FIG. 2A and FIG. 2B, the piston 39 and the positioning rod 22 are lowered by the urging force of the lock spring 43.

With this, the ball 28 functioning as the cam portion pushes the cam surface 32 toward the opening 20 (leftward in the figures), and therefore the positioning rod 22 and the output rod 38 are moved to the left substantially horizontally while being lowered, and the pushing portion 33 passes through the opening 20 and presses the inner periphery of the circular hole 9 of the work 8.

Thus, the circular hole 9 of the work 8 is positioned by the pushing portion 33 and the positioning projection 35 with respect to a direction of the two arrows M, M, while the circular hole 9 is allowed to move in a direction orthogonal to the direction of the two arrows M, M.

Note that, it is possible to change the above direction of positioning (the direction of the two arrows M, M), by adjusting the thickness of the shim 7 or the number of attached shims 7.

Unlike the above-mentioned conventional art, in the present invention, it is not necessary to provide the strut 6 with a through hole which supports the ball horizontally movably, in order to perform the above-described positioning. This decreases the outer diameter size of the strut 6, which makes it possible to position a work having a smaller diameter circular hole.

Further, since the work 8 is positioned by lowering the positioning rod 22 (and the cam surface 32), it is possible to press the work 8 onto the seating surfaces 11*a* via the pushing portion 33 at the time of positioning.

Furthermore, the strut 6 is formed into a circular plug shape, and therefore its rigidity is higher than that formed into a semicircular shape or a bow shape. With this, positioning accuracy of the positioning apparatus is improved.

In addition, since the strut 6 has the top wall 17 which covers an upper portion of the positioning rod 22, foreign matter such as swarf and dust is prevented from intruding into the upper insertion hole 16.

In the locking operation, the positioning rod 22 and the output rod 38 are moved horizontally while being lowered, and this brings about the following advantages. Specifically, in a case where the work 8 is thick, a large contact area is secured between an inner peripheral surface of the circular hole 9 of the work 8 and the pushing portion 33 of the positioning rod 22. This enables the work 8 to be positioned firmly. Further, compared to the ball of the above-mentioned conventional art, it is possible to form the pushing portion 33 so as to have a longer vertical length. Therefore, in a case where the work 8 is thin, even if a vertical position of the pushing portion 33 is shifted during a locking drive, the work 8 is positioned reliably.

Note that, there is no problem even if the positioning rod 22 and the output rod 38 are moved while being inclined, instead of being moved horizontally while being lowered.

Figure 4:
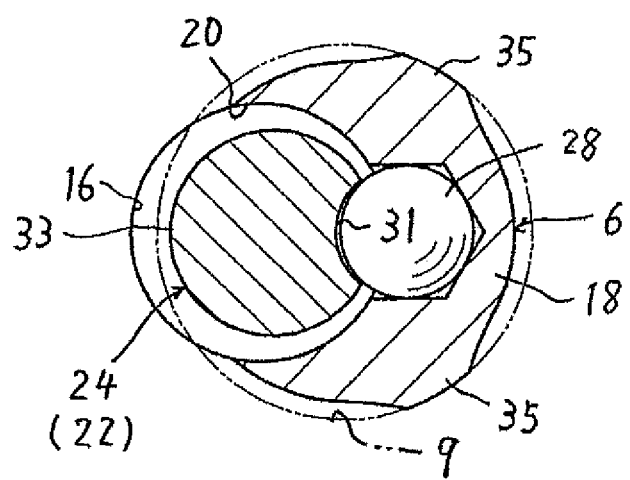
FIG. 4 shows an exemplary variation of the first embodiment, and is a view similar to FIG. 3.

FIG. 4 shows an exemplary variation of the first embodiment. Further, FIG. 5A and FIG. 5B, respective figures of FIG. 6 to FIG. 8, and FIG. 9A and FIG. 9B respectively show a second embodiment to a sixth embodiment of the present invention. In the exemplary variation and the other embodiments, components identical (or similar) to those in the above first embodiment will be designated by the same reference numerals, in principle, to give a description.

Figure 3:
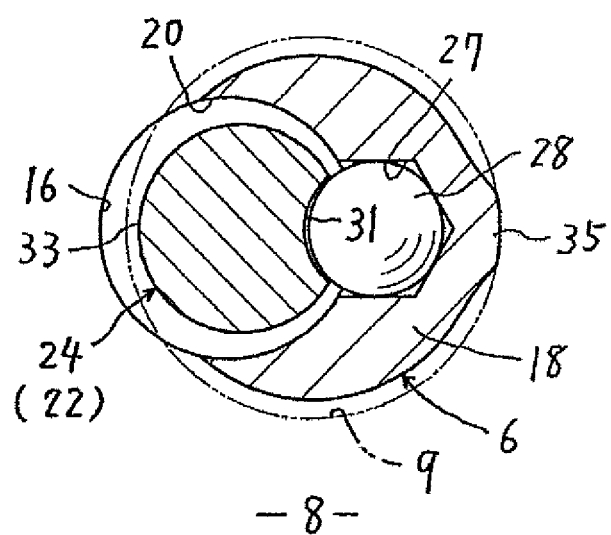
FIG. 3 is an enlarged view of a main portion in FIG. 1B.

The exemplary variation of FIG. 4 is different from the first embodiment of FIG. 3, in the following respect.

Two positioning projections 35 are provided on the outer periphery portion of the strut 6, and these two positioning projections 35 and the pushing portion 33 are arranged circumferentially at predetermined intervals. This structure makes it possible to position the work 8 along an axis of the circular hole 9 of the work 8.

Figure 5B:
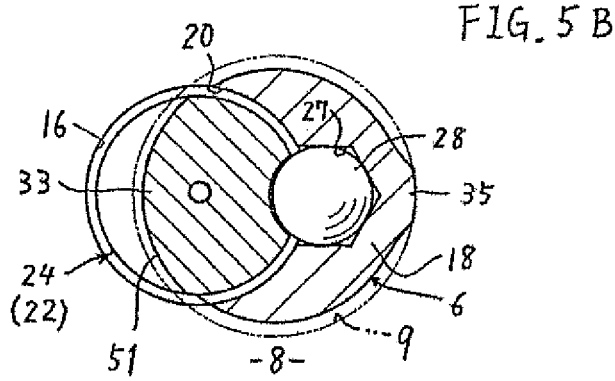
FIG. 5A and FIG. 5B show a second embodiment of the present invention.
Figure 5A:
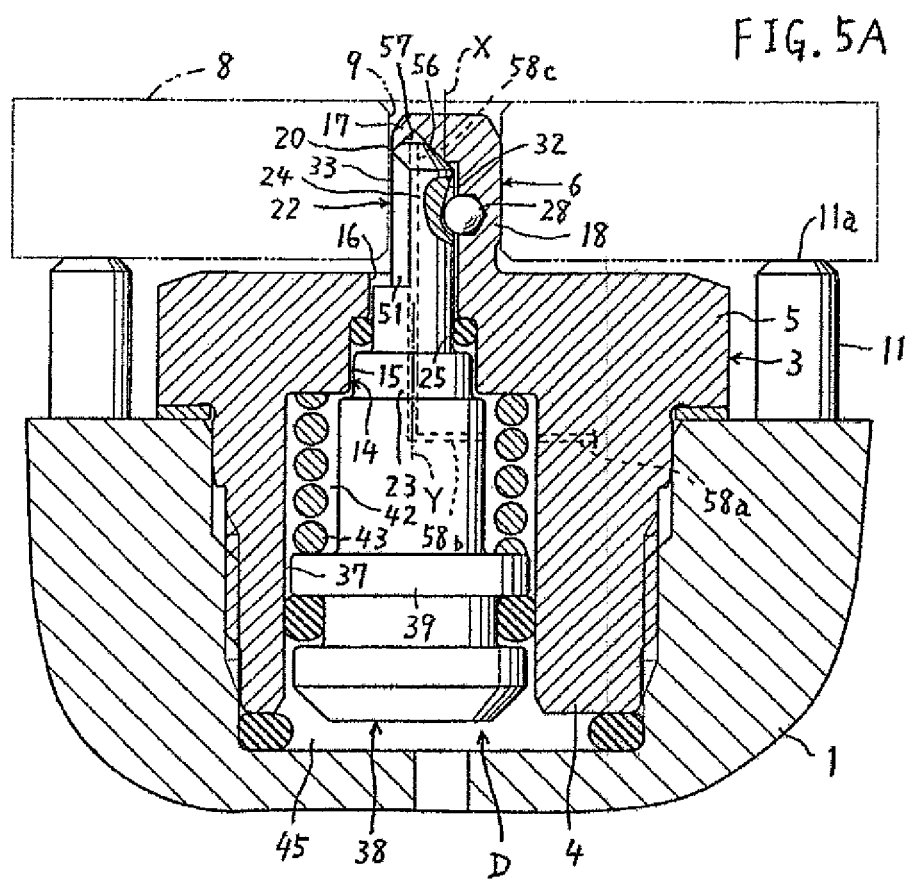

The second embodiment of FIG. 5A and FIG. 5B is different from the first embodiment, in the following respect.

A left portion (a portion closer to the opening 20) of the outer periphery portion of the upper rod 24 of the positioning rod 22 is cut away in an arc manner so as to be along the inner periphery of the circular hole 9 of the work 8, and the pushing portion 33 is provided on an outer periphery of a cut portion 51. With this structure, the following advantage is provided, compared to the structure of the first embodiment of FIG. 3. Since a larger area is secured for the pushing portion 33, its life-span is increased, and positioning with respect to the direction of the two arrows M, M (see FIG. 1B) is reliably performed. Moreover, a gap between the upper rod 24 and the strut 6 is decreased, and therefore foreign matter such as swarf is prevented from intruding into the gap.

Further, in this embodiment, a frustoconical guide portion 56 is formed on an upper end portion of the upper rod 24 of the positioning rod 22. A conical guide hole 57 is opened in the top wall 17 of the strut 6. The guide portion 56 is fitted into the guide hole 57, and thereby the positioning rod 22 is returned to a released position shown in the figure. Specifically, in this embodiment, in addition to a centering function by means of the elastic force of the sealing member 25, a centering function by means of the fitting between the guide hole 57 and the guide portion 56 is added.

Moreover, the positioning apparatus is provided with a means for detecting the released state. Specifically, an inlet passage 58*a* provided in the main body 4 so as to be connected to a pneumatic power source (not shown) is communicatively connected to the inside of the guide hole 57, via the lock chamber 42, a communication passage 58*b* provided inside the output rod 38 and the positioning rod 22, and a detection hole 58*c* opened in an upper end surface of the guide portion 56. In the released state shown in the figure, the guide portion 56 is fitted in the guide hole 57, and thereby pressurized air is prevented from being discharged through the detection hole 58*c*. With this, the pressure in the inlet passage 58*a* is increased higher than a setting value, and this increase in pressure is detected by a pressure sensor (not shown).

Note that, as the centering function, instead of the structure such that the guide portion 56 is provided on an upper portion of the positioning rod 22 and the guide hole 57 is provided in the top wall 17, the following structure is also possible: a tapered hole which tapers down upward is formed in the lower insertion hole 15, and a tapered outer peripheral surface which is to be fitted into the tapered hole from below is formed on the lower rod 23.

Figure 6:
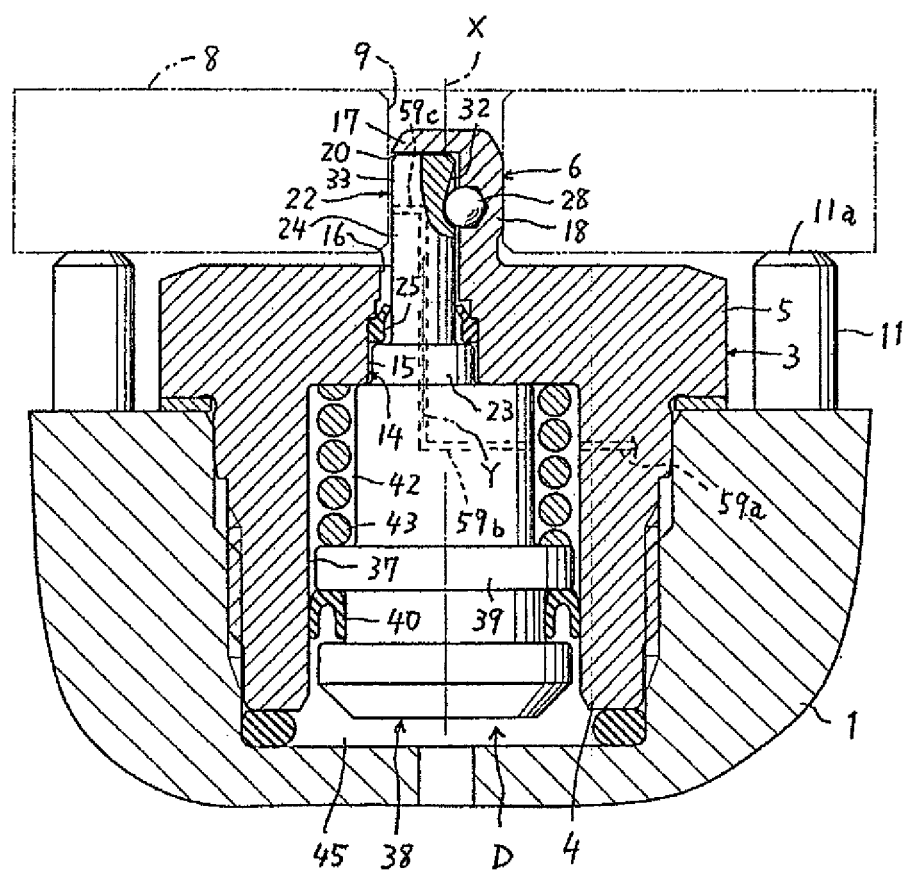
FIG. 6 shows a third embodiment of the present invention, and is a view similar to FIG. 1A.

The third embodiment of FIG. 6 is different from the first embodiment in the following respect.

The rod hole 37 is arranged coaxially with the strut 6. Therefore, the rod hole 37 is arranged coaxially with an axis of the main body 4 of the housing 3, and this makes it easier to machine the hole.

Further, the sealing member 25 attached between the lower insertion hole 15 and a lower portion of the upper rod 24 is constituted by a scraper, and the sealing member 40 attached between the rod hole 37 and the piston 39 is constituted by a U-packing.

Moreover, the positioning apparatus is provided with a means for detecting the locked state. Specifically, an inlet passage 59$a$ provided in the main body 4 so as to be connected to the pneumatic power source (not shown) is communicatively connected to an exterior space via the lock chamber 42, a communication passage 59$b$ provided inside the output rod 38 and the positioning rod 22, and a detection hole 59$c$ opened in the pushing portion 33 of the upper rod 24. Then, when the apparatus is switched from the released state shown in the figure to the locked state, the pushing portion 33 is brought into contact with the inner periphery of the circular hole 9 of the work 8, and this prevents pressurized air from being discharged through the detection hole 59$c$. With this, the pressure in the inlet passage 59$a$ is increased higher than a setting value, and this increase in pressure is detected by the pressure sensor (not shown).

Figure 7:
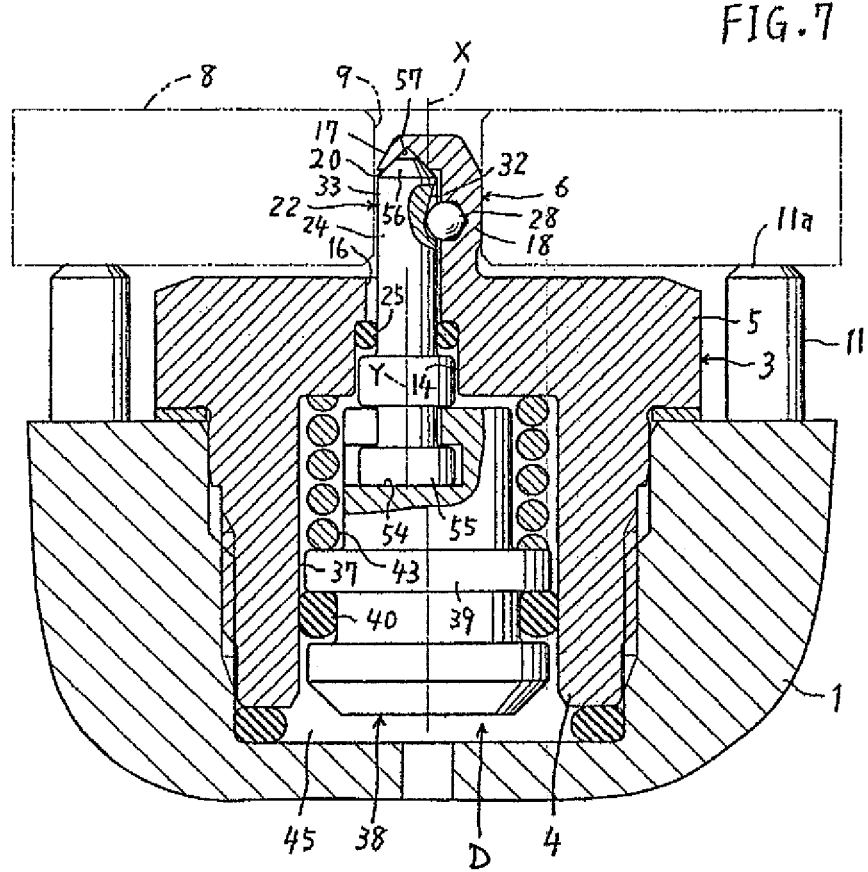
FIG. 7 shows a fourth embodiment of the present invention, and is a view similar to FIG. 1A.

The fourth embodiment of FIG. 7 is different from the first embodiment in the following respect.

The output rod 38 and the positioning rod 22 are formed separately from each other. An engaging portion 55 provided to a lower portion of the positioning rod 22 is horizontally movably connected to a lateral groove 54 provided in the upper portion of the output rod 38. With this, during the locking drive, the positioning rod 22 smoothly moves horizontally. Therefore, a contact area between the inner periphery of the circular hole 9 of the work 8 and the pushing portion 33 is increased, and the work 8 is positioned reliably further.

Further, similarly to the second embodiment (FIG. 5A and FIG. 5B), the frustoconical guide portion 56 is formed on the upper end portion of the upper rod 24 of the positioning rod 22, and the conical guide hole 57 is opened in the top wall 17 of the strut 6.

Figure 8:
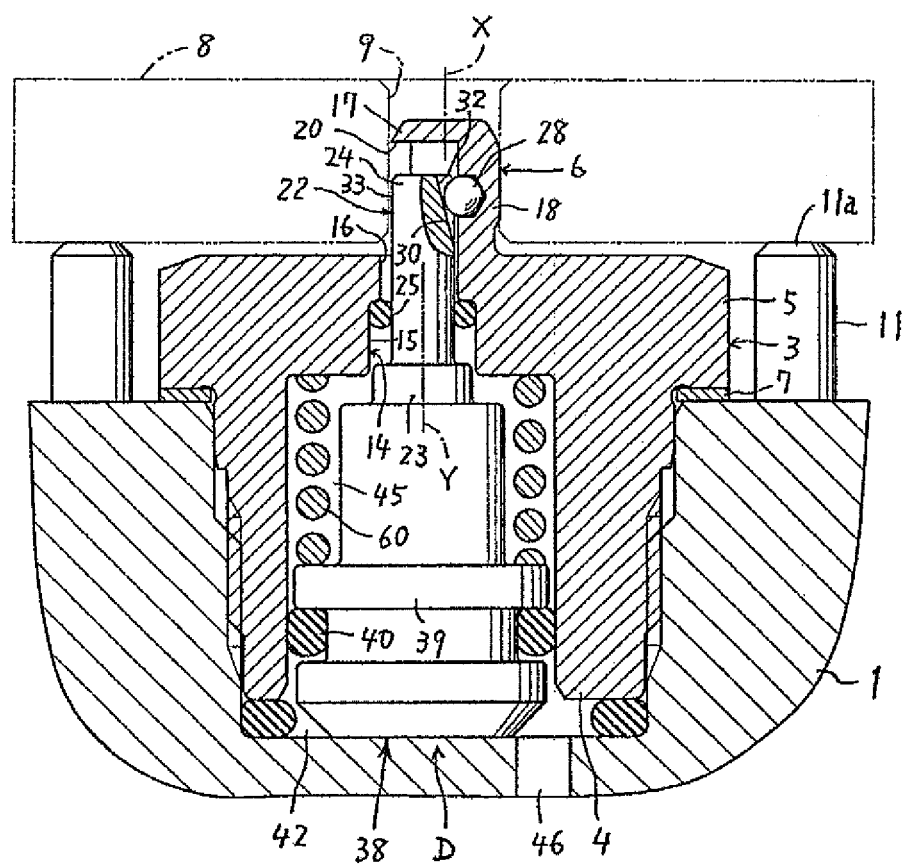
FIG. 8 shows a fifth embodiment of the present invention, and is a view similar to FIG. 1A.

The fifth embodiment of FIG. 8 is different from the first embodiment in the following respect.

The cam surface 32 formed on the bottom wall of the cam groove 30 is formed so that the cam surface 32 becomes closer to the axis of the positioning rod 22 in an upward direction.

Further, the lock chamber 42 is formed below the piston 39, and a returning spring 60 is attached in the release chamber 45 formed above the piston 39.

In the released state of FIG. 8, compressed air has been discharged from the lock chamber 42, and the returning spring 60 lowers the output rod 38 and the positioning rod 22.

When the apparatus is switched from the released state to the locked state (not shown), compressed air is supplied to the lock chamber 42, to raise the output rod 38 and the positioning rod 22. With this, the ball 28 pushes the cam surface 32 leftward in the figure, and then the pushing portion 33 presses the inner periphery of the circular hole 9 of the work 8.

The sixth embodiment of FIG. 9A and FIG. 9B is different from the first embodiment in the following respect.

The support hole 27 is opened in a right portion of the upper rod 24 of the positioning rod 22. Into the support hole 27, the ball 28 functioning as the cam portion is fitted, and a right portion of the ball 28 is projected rightward relative to an outer periphery of the upper rod 24. The cam surface 32 which the ball 28 makes an engagement with is provided on an inner periphery portion of the strut 6.

These embodiments and exemplary variation are changeable as follows.

The cam portion 28 may be cylindrical instead of the ball exemplarily described above. In this case, the cam surface 32 may be constituted by a flat surface, instead of being formed in an arc manner in horizontal section. Further, the cam portion 28 may be formed integrally with the strut 6 (or the positioning rod 22), instead of being formed separately from the strut 6 (or the positioning rod 22).

The pushing portion 33 may be provided separately from the positioning rod 22, instead of being formed integrally with the positioning rod 22.

The lower insertion hole 15 and the upper insertion hole 16 of the insertion hole 14 may be formed coaxially with each other, instead of being arranged eccentrically. In this case, it is conceivable to form the opening 20 by opening a lateral hole in the peripheral wall 18 of the strut 6.

The strut 6 may be formed into a semicircular shape or a bow shape in horizontal section, instead of being formed into a circular plug shape as exemplarily described above. Instead of being formed integrally with the main body 4 of the housing 3, the strut 6 may be formed separately from the main body 4 and fixed to the main body 4 by a fastening member such as a bolt.

Instead of being screwed in the attachment hole 2 of the base member 1, the housing 3 may be inserted into a straight attachment hole and fixed to the base member 1 by a bolt or the like, or, may be press-fitted into the straight attachment hole. In this case, the shim 7 can be omitted.

Further, in an environment that there is less foreign matter such as swarf and dust, the top wall 17 may be omitted from the strut 6.

For the positioning projection(s) 35 provided on the outer periphery portion of the strut 6, it is possible to substitute an arc-shape surface or an oval surface provided on the outer periphery portion of the strut 6.

Instead of being a spring locking and pneumatic releasing type, the driving means D may be a pneumatic locking and spring releasing type, and further, it may be a double-acting type. Furthermore, working fluid of the driving means D may be pressurized oil or the like, instead of compressed air.

Moreover, the driving means D may be a means using an electric actuator such as an electric motor and a solenoid, or may be a manual means using a propulsive screw or the like.

The to-be-positioned member may be a work pallet, a metal die, various jigs, or the like, instead of the work 8 exemplarily described above.

Furthermore, it is a matter of course that other changes or alterations can be made on the present invention within the scope of envisagement of one skilled in the art.

The invention claimed is:

1. A positioning apparatus, comprising:
    a strut (6) projected upward from a main body (4) of a housing (3);

a positioning rod (22) which is inserted into an upper portion of the housing (3) so as to be movable vertically and radially and is brought to face the strut (6), the positioning rod (22) being able to be inserted, together with the strut (6), into a circular hole (9) of a to-be-positioned member (8);

a cam portion (28) provided to one member out of two members which are the strut (6) and the positioning rod (22) so as to project from the one member toward the other member;

a cam surface (32) provided vertically on the other member so as to make an engagement with the cam portion (28);

a pushing portion (33) provided on an outer periphery portion of the positioning rod (22) at a position opposite to the cam surface (32) and the cam portion (28), the pushing portion (33) being able to face an inner periphery of the circular hole (9) of the to-be-positioned member (8);

a driving arrangement (D) which drives the positioning rod (22) vertically, wherein the positioning apparatus is configured so that, when the driving arrangement (D) drives the positioning rod (22) either upward or downward for locking, the cam portion (28) presses, via the cam surface (32), the pushing portion (33) onto the inner periphery of the circular hole (9) of the to-be-positioned member (8);

the driving arrangement (D) includes: a rod hole (37) formed in the main body (4) of the housing (3); and an output rod (38) vertically movably inserted into the rod hole (37), and the positioning rod (22) is connected to the output rod (38), and wherein the output rod (38) and the positioning rod (22) are formed monolithically with each other, and the output rod (38) is radially movably inserted into the rod hole (37).

2. The positioning apparatus according to claim 1, wherein:

the strut (6) is formed into a plug shape so as to correspond to the circular hole (9) of the to-be-positioned member (8);

an insertion hole (14) having a hole axis (Y) which is eccentric relative to a central axis (X) of the strut (6) is disposed vertically in the upper portion of the housing (3), and the positioning rod (22) is inserted into the insertion hole (14);

an opening (20) is formed laterally in a peripheral wall portion of a peripheral wall (18) of the strut (6), which peripheral wall portion is closer to the hole axis (Y); and the positioning apparatus is configured so that the pushing portion (33) passes through the opening (20) to be pressed onto the inner periphery of the circular hole (9) of the to-be-positioned member (8).

3. A positioning apparatus according to claim 2, wherein an elastic member (25) which urges the positioning rod (22) toward the hole axis (Y) of the insertion hole (14) is attached to the housing (3).

4. The positioning apparatus according to claim 2, wherein:

the insertion hole (14) includes a lower insertion hole (15) having the hole axis (Y) and an upper insertion hole (16) arranged above the lower insertion hole (15); and a hole axis of the upper insertion hole (16) is arranged to be eccentric relative to the hole axis (Y) in a direction away from the central axis (X), and thereby the opening (20) is arranged in the peripheral wall (18) of the strut (6).

5. The positioning apparatus according to claim 2, wherein the driving arrangement (D) includes: a rod hole (37) formed in the main body (4) of the housing (3); and an output rod (38) vertically movably inserted into the rod hole (37), and the positioning rod (22) is connected to the output rod (38).

6. The positioning apparatus according to claim 5, wherein the rod hole (37) is arranged coaxially with the insertion hole (14).

7. The positioning apparatus according to claim 5, wherein the rod hole (37) is arranged coaxially with the strut (6).

8. The positioning apparatus according to claim 5, wherein the positioning rod (22) is radially movably connected to the output rod (38).

9. The positioning apparatus according to claim 1, wherein the cam portion (28) is provided to the strut (6), and the cam surface (32) is provided on the positioning rod (22).

10. The positioning apparatus according to claim 1, wherein the cam portion (28) is provided to the positioning rod (22), and the cam surface (32) is provided on the strut (6).

11. The positioning apparatus according to claim 1, wherein the cam surface (32) is formed so that the cam surface (32) becomes closer to an axis of the positioning rod (22) or a central axis (X) of the strut (6) in a downward direction.

12. The positioning apparatus according to claim 1, wherein the cam surface (32) includes a bottom wall of a cam groove (30) formed in the positioning rod (22) or in the strut (6).

13. The positioning apparatus according to claim 12, wherein the cam portion (28) includes a ball which is fitted into the cam groove (30).

14. The positioning apparatus according to claim 1, wherein the strut (6) includes a top wall (17) which covers an upper portion of the positioning rod (22).

15. The positioning apparatus according to claim 14, wherein a guide hole (57) which tapers narrower in an upward direction is opened in an under surface of the top wall (17), and a guide portion (56) which is fitted into the guide hole (57) from below is provided on the upper portion of the positioning rod (22).

16. The positioning apparatus according to claim 15, wherein a detection hole (58c) which is configured to be closed with the guide hole (57) and is configured to be opened in an upper portion of the guide portion (56), and the apparatus is configured so that pressurized air for detecting a released state is suppliable to the detection hole (58c).

17. The positioning apparatus according to claim 1, wherein a detection hole (59c) is configured to be opened in an outer peripheral surface of the pushing portion (33), and the apparatus is configured so that pressurized air for detecting a locked state is suppliable to the detection hole (59*c*).

18. The positioning apparatus according to claim 1, wherein
a single positioning projection (35) is provided on the outer periphery portion of the strut (6) at a position opposite to the pushing portion (33).

19. The positioning apparatus according to claim 1, wherein
two positioning projections (35) (35) are provided on the outer periphery portion of the strut (6), and the two positioning projections (35) (35) and the pushing portion (33) are arranged circumferentially at predetermined intervals.

20. A positioning apparatus, comprising:
a strut (6) which is projected upward from a main body (4) of a housing (3) and is formed into a plug shape so as to be inserted into a circular hole (9) of a to-be-positioned member (8);
an insertion hole (14) formed vertically in an upper portion of the housing (3), the insertion hole (14) having a hole axis (Y) which is eccentric relative to a central axis (X) of the strut (6);
an opening (20) formed laterally in a peripheral wall portion of a peripheral wall (18) of the strut (6), which portion is closer to the hole axis (Y);
a positioning rod (22) inserted into the insertion hole (14) so as to be movable vertically and radially;
a cam portion (28) provided at a position opposite to the opening (20), the cam portion (28) being provided to one member out of two members which are the strut (6) and the positioning rod (22) so as to project from the one member toward the other member;
a cam surface (32) provided vertically on the other member so as to make an engagement with the cam portion (28);
a pushing portion (33) provided on an outer periphery portion of the positioning rod (22) at a position closer to the opening (20), the pushing portion (33) being able to face an inner periphery of the circular hole (9) of the to-be-positioned member (8);
a driving arrangement (D) which drives the positioning rod (22) vertically, wherein
the positioning apparatus is configured so that, when the driving arrangement (D) drives the positioning rod (22) either upward or downward for locking, the cam portion (28) pushes the pushing portion (33) via the cam surface (32) toward the opening (20), and thereby, the pushing portion (33) passes through the opening (20) to be pressed onto the inner periphery of the circular hole (9) of the to-be-positioned member (8);
wherein the driving arrangement (D) includes: a rod hole (37) formed in the main body (4) of the housing (3); and an output rod (38) vertically movably inserted into the rod hole (37), and the positioning rod (22) is connected to the output rod (38), and
wherein the output rod (38) and the positioning rod (22) are formed monolithically with each other, and the output rod (38) is radially movably inserted into the rod hole (37).

* * * * *